(12) United States Patent  (10) Patent No.: US 7,711,966 B2
Prabhakaran et al.  (45) Date of Patent: May 4, 2010

(54) DYNAMIC CLOCK FREQUENCY ADJUSTMENT BASED ON PROCESSOR LOAD

(75) Inventors: Rajeev Prabhakaran, San Diego, CA (US); Jagrut Viliskumar Patel, San Diego, CA (US); Martin (Vyungchon) Choe, San Diego, CA (US); Kyle Parrington, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 728 days.

(21) Appl. No.: 10/931,496

(22) Filed: Aug. 31, 2004

(65) Prior Publication Data

US 2006/0047987 A1  Mar. 2, 2006

(51) Int. Cl.
 *G06F 1/26* (2006.01)
(52) U.S. Cl. .................. 713/300; 713/310; 713/320; 713/321; 713/322; 713/323; 713/324; 713/330; 713/340
(58) Field of Classification Search ................ 713/300, 713/310, 320–324, 330, 340
See application file for complete search history.

(56) References Cited

U.S. PATENT DOCUMENTS

| 5,623,647 | A |   | 4/1997  | Maitra ........................ 395/556 |
| 5,774,704 | A | * | 6/1998  | Williams .................... 713/501 |
| 5,815,694 | A |   | 9/1998  | Ganfield et al. ............. 395/556 |
| 5,996,084 | A | * | 11/1999 | Watts ......................... 713/323 |
| 6,073,244 | A | * | 6/2000  | Iwazaki ...................... 713/322 |
| 6,076,171 | A | * | 6/2000  | Kawata ....................... 713/501 |
| 6,112,310 | A | * | 8/2000  | Jun et al. .................... 713/501 |
| 6,298,448 | B1 | * | 10/2001 | Shaffer et al. ............... 713/322 |
| 6,397,343 | B1 | * | 5/2002  | Williams et al. ............ 713/501 |
| 6,928,559 | B1 | * | 8/2005  | Beard ........................ 713/300 |
| 7,028,211 | B2 | * | 4/2006  | Mantani ..................... 713/600 |
| 7,051,227 | B2 | * | 5/2006  | Kazachinsky et al. ....... 713/500 |
| 7,058,824 | B2 | * | 6/2006  | Plante et al. ................ 713/300 |
| 7,124,309 | B2 | * | 10/2006 | Burns et al. ................. 713/300 |
| 7,254,721 | B1 | * | 8/2007  | Tobias et al. ................ 713/300 |
| 2002/0038433 | A1 |   | 3/2002  | Dalrymple et al. .......... 713/322 |
| 2003/0226047 | A1 |   | 12/2003 | Park et al. ................... 713/300 |
| 2003/0226049 | A1 |   | 12/2003 | Mantani ..................... 713/322 |

FOREIGN PATENT DOCUMENTS

WO  02074046  9/2002

OTHER PUBLICATIONS

International Search Report-PCT/US05/030933, Internatioanl Search Authority-European Patent Office, Feb. 24, 2006.
Written Opinion-PCT/US05/030933, International Search Authority-European Patent Office, Feb. 24, 2006.

* cited by examiner

*Primary Examiner*—Abdelmoniem Elamin
(74) *Attorney, Agent, or Firm*—Eric Ho

(57) ABSTRACT

In general, the disclosure is directed to techniques for reducing power consumption within computing devices, such as wireless communication devices. A device dynamically adjusts the CPU clock frequency based on CPU load in order to reduce power consumption. The device monitors the load of the CPU using a number of sample interrupts. The device determines whether to adjust the clock frequency based on the monitored load of the CPU. In general, the device increases the clock frequency when the load of the CPU is high and decreases the clock frequency when the load of the CPU is low.

31 Claims, 6 Drawing Sheets

DYNAMIC CLOCK FREQUENCY ADJUSTMENT BASED ON PROCESSOR LOAD

TECHNICAL FIELD

The disclosure relates to computing devices and, more particularly, techniques for reducing power consumption in computing devices.

BACKGROUND

The need for low power consumption in computing devices has increased with the increase in consumer demand for computing devices that are smaller in size yet have larger processing capabilities. The need for low power consumption is especially prevalent in wireless computing devices, such as cellular telephones and personal digital assistants (PDAs) that include applications such as video, MP3 playback, Internet access, and camera functionality. Reductions in power consumption extend battery life, enabling the use of smaller batteries to reduce the size, weight and cost of wireless computing devices.

Power consumption in a processor includes both static power consumption and dynamic power consumption. Static power consumption is power that is consumed by a processor due to leakage current and the resistivity of the silicon technology. Dynamic power consumption, sometimes referred to as switching loss, occurs when processing circuitry and signals are transitioning between logic states. The magnitude of dynamic power dissipation correlates with the system voltage, clock frequency and switching activity. The amount of dynamic power dissipation (P) for a processor can be approximated by the equation $P=C*F*V^2$, where C is the dynamic capacitance, F is the switching frequency, which is dependent on the clock frequency, and V is the supply voltage.

One existing approach to reducing power consumption in a computing devices requires applications to inform the operating system of their frequency requirements. In this case, each applications must be aware of its exact performance requirements as well as the clock speeds available on the associated processor. Consequently, application developers are required to have intimate knowledge of the processor usage pattern for each of the applications. However, this approach does not account for the combined processor demands of multiple applications running simultaneously.

SUMMARY

In general, the disclosure is directed to techniques for reducing power consumption within computing-devices, such as wireless communication devices. In particular, a device dynamically adjusts its CPU clock frequency based on a profile of the processing load of the CPU in order to reduce power consumption.

The device periodically monitors the load of the CPU and determines whether to adjust the frequency of the CPU clock based on the monitored load of the CPU. The device increases the frequency of the clock when the load of the CPU is high, and decreases the frequency of the clock when the load of the CPU is low.

By adjusting the clock frequency according to actual CPU load, the device can reduce unnecessary power consumption. Techniques for dynamic clock adjustment, as described herein, can be achieved without specific intervention by application developers. In addition, the techniques may be platform-independent and require no changes to application code.

In one embodiment, the disclosure provides a device comprising a monitoring module that performs sample interrupts to determine a status of a processor at particular times, a clock adjustment module that determines a load of the processor based on the status determined by the monitoring module, and generates a clock adjustment based on the determined load, and a frequency controller that adjusts a processor clock frequency as a function of the clock adjustment.

In another embodiment, the disclosure provides a method comprising performing sample interrupts to determine a status of a processor at particular times, determining a load of the processor based on the sample interrupts, and adjusting a clock frequency to the processor as a function of the load of the processor.

In an added embodiment, the disclosure provides a computer-readable medium comprising instructions to cause a processor to perform sample interrupts to determine a status of a processor at particular times, determine a load of the processor based on the sample interrupts, and generate an adjustment to a clock frequency to the processor as a function of the load of the processor.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
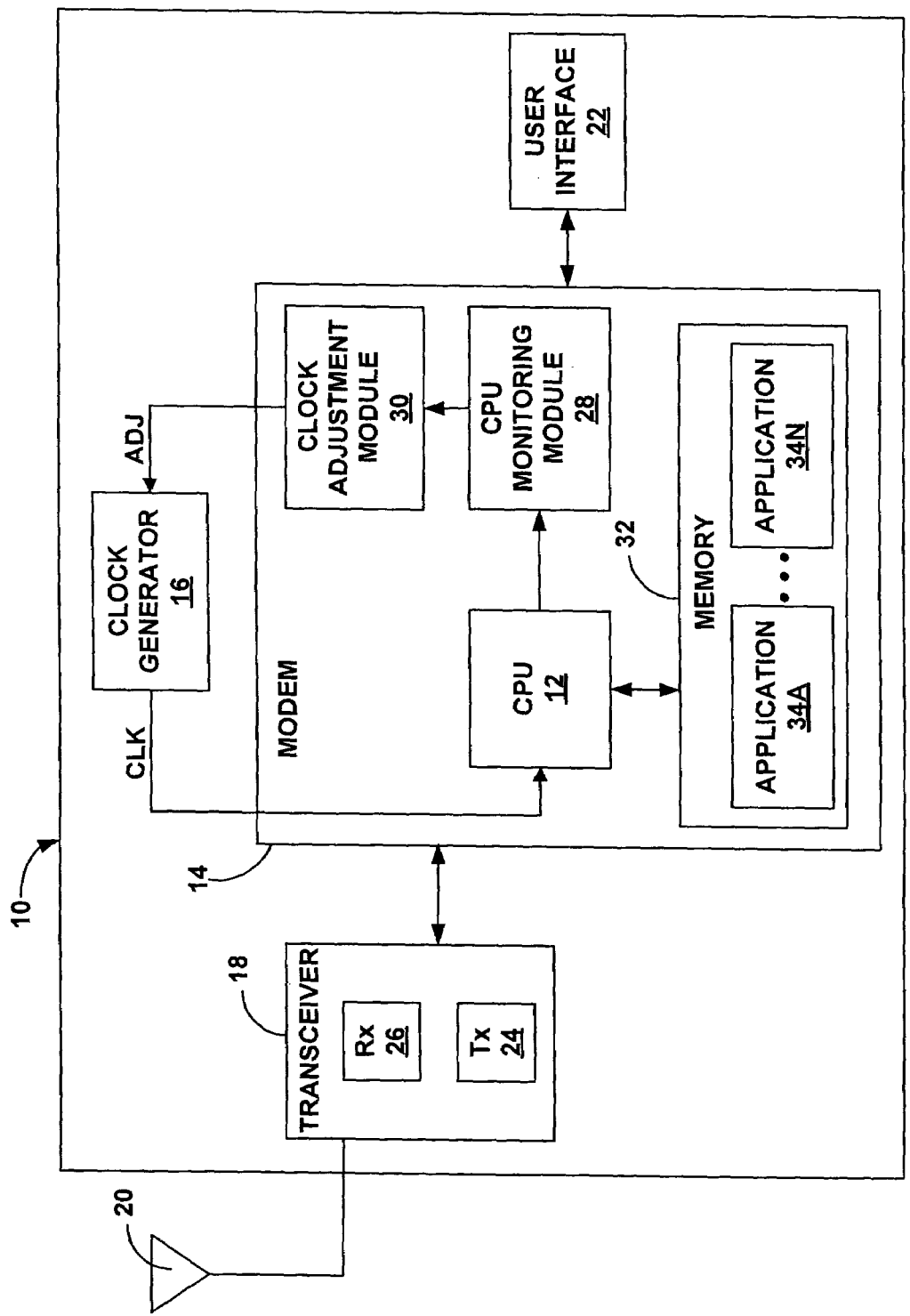
FIG. 1 is a block diagram illustrating a wireless communication device that dynamically adjusts a clock frequency based on a current load of a CPU.

FIG. 1 is a block diagram illustrating an exemplary wireless communication device 10 that dynamically adjusts a clock frequency of wireless communication device 10 based on the current processing load of a central processing unit (CPU) 12. Wireless communication device 10 may take the form of any of a variety of wireless equipment, such as a mobile wireless telephone, a wireless computer, a personal digital assistant (PDA) with wireless communication capabilities and the like. Although described in terms of wireless communication devices, the techniques described herein may be applied to other wireless or wired computing devices that would benefit from power management features.

As shown in FIG. 1, wireless device 10 includes a modem 14, a clock generator 16, a transceiver 18, an antenna 20 and a user interface 22. Antenna 20 receive and transmits wireless between wireless communication device 10 and a wireless communication network. Although FIG. 1 depicts the use of a single antenna 20, wireless communication device 10 may include more than one antenna. For example, wireless communication device 10 may include one antenna for receiving signals and another antenna for transmitting signals. Alternatively, or in addition, wireless communication device 10 may include multiple antennas for receive and transmit diversity.

Transceiver 18 includes transmit circuitry (Tx) 24 and receive circuitry (Rx) 26. Transmit circuitry 24 upconverts transmitted signals to a radio frequency (RF), while receive circuitry downconverts RF signals to a baseband frequency for processing by CPU 12. In this sense, transceiver 18 integrates both transmit and receive circuitry within a single transceiver component. In some cases, however, transmit and receive circuitry may be formed by separate transmitter and receiver components.

Clock generator 16 is electrically coupled to modem 14 and provides a clock signal to drive the components of modem 14, such as CPU 12. Clock generator 16 may comprise, for example, a crystal oscillator coupled to a phase-locked loop (PLL) that generates the clock signal to drive CPU 12. As will be described, wireless communication device 10 dynamically adjusts the frequency of clock generator 16 as a function of the processing load presented to CPU 12, thereby reducing power consumption by the wireless communication device.

Modem 14 further includes a CPU monitoring module 28, a clock adjustment module 30, a memory 32, and applications 34A-34N (collectively "applications 34") loaded into the memory. CPU monitoring module 28 monitors the actual processing load of CPU 12 and clock adjustment module 30 determines whether to adjust the frequency of clock generator 16 based on the monitored load of CPU 12. In particular, clock adjustment module 30 increases the frequency of clock generator 16 when the load of CPU 12 is high and decreases the frequency of clock generator 16 when the load of CPU 12 is low. In this manner, clock generator 16 is responsive to the actual processing load at a given point in time.

CPU monitoring module 28 monitors the load of CPU 12 using sample interrupts. As an example, CPU monitoring module 28 may periodically perform sample interrupts to determine the load of CPU 12. CPU monitoring module 28 stores the data gathered during each of the sample interrupts in a CPU profile that represents the load on CPU 12. CPU monitoring module 28 may store the CPU profile in memory 32.

Clock adjustment module 30 uses the CPU profile to determine whether to adjust the frequency of clock generator 16. In particular, clock adjustment module 30 analyzes the information in the CPU profile to determine whether the load on CPU 12 is "high" or "low." Clock adjustment module 30 sends an adjustment signal (labeled "ADJ" in FIG. 1) to clock generator 16 if an adjustment of the frequency of clock generator 16 is desired. For example, if clock adjustment module 30 determines that the load of CPU 12 is low and the current frequency of clock generator 16 is high, then the clock adjustment module sends the adjustment signal to clock generator 16 to decrease the clock frequency. Likewise, if clock adjustment module 30 determines that the load of CPU 12 is high and the current frequency of clock generator 16 is low, then the clock adjustment module sends the adjustment signal to clock generator 16 to increase the clock frequency.

The load of CPU 12 and the current frequency of clock generator 16 may be determined to be "low" and "high" by reference to pertinent load and clock frequency thresholds. In some embodiments, multiple thresholds such as "low," "medium," and "high" may be used to characterize the CPU load and clock frequency. In each case, the thresholds are used to dynamically adjust the clock frequency to suit the present processing load experienced by CPU 12.

Applications 34 may include a number of multi-media features, such as a video application, a voice application, an electronic mail application, a web browser application, a text message application, a camera application, and the like. A user interact with wireless computing device 10 via user interface 22 to invoke one or more of applications 34. The user may, for example, press a button on wireless computing device 10 that invokes a camera application of a picture phone. User interface 22 may comprise a display and an input device, such as one or more buttons, a keypad, touchscreen, stylus or the like.

CPU monitoring module 28 and clock adjustment module 30 may be implemented solely in software, or hardware, or may be implemented as a combination of software, hardware, or firmware. CPU monitoring module 28 may take the form of a dedicated hardware component independent of CPU 12, or may be a programmable function of CPU 12. Similarly, clock adjustment module 30 may be formed by an independent hardware component, or as a programmable function of CPU 12. For example, modem 14 may include one or more processors that execute software instructions to provide the functionality of CPU monitoring module 28 or clock adjustment module 30.

Adjusting the clock frequency on a dynamic basis as a function of the load of CPU 12 allows wireless communication device 10 to reduce the amount of power consumption during times of low CPU load, thus extending the battery-life of wireless communication device 10. In particular, reduction in the clock frequency results in a reduction in the number of logic state transitions within CPU 12. Although the techniques above are described with respect to wireless communication device 10, the techniques may be used in wired communication devices that include power conservation features. Reduced power consumption in wired devices may reduce the device's cooling requirements, thus providing for a smaller, quieter wired device.

Figure 2:
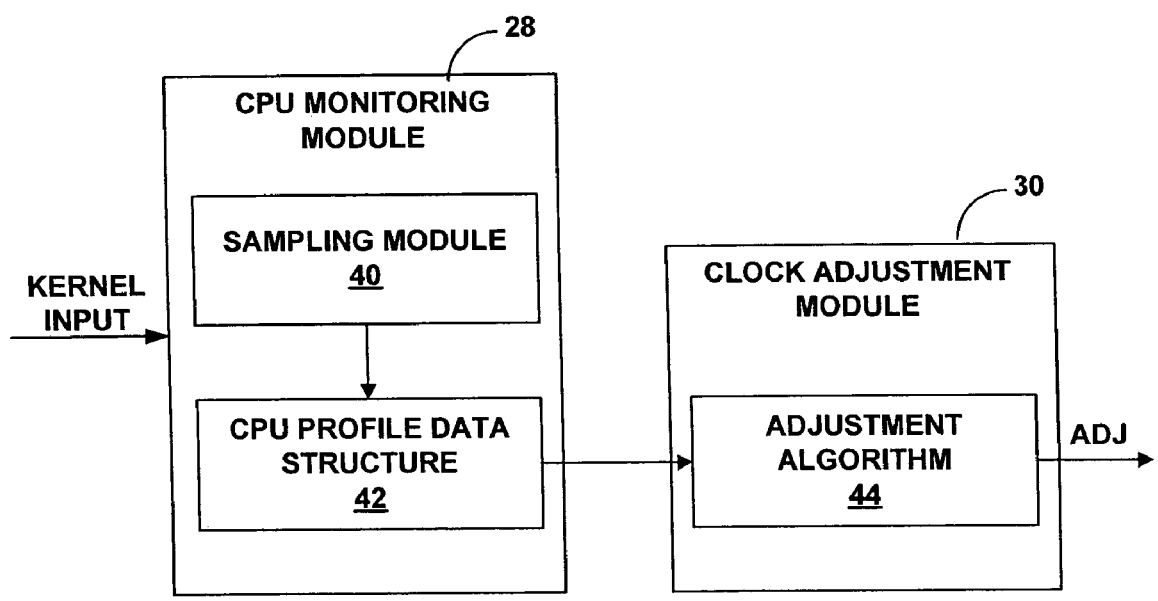
FIG. 2 is a block diagram illustrating a CPU monitoring module and a clock adjustment module in further detail.

FIG. 2 is a block diagram illustrating CPU monitoring module 28 and clock adjustment module 30 in further detail. As described briefly above, CPU monitoring module 28 monitors the load of CPU 12 and clock adjustment module 30 determines whether to adjust the frequency at which clock generator 16 operates based on the monitored load of CPU 12.

CPU monitoring module 28 includes a sampling module 40 and a CPU profile data structure 42. Sampling module 40 performs regular, high priority, sample interrupts to the operating system kernel of CPU 12 to determine the CPU load. An interrupt handler responds to the interrupt with status information concerning the instantaneous processing load of CPU 12.

The load may be expressed as any metric of CPU load, such as the proportion of CPU cycles consumed by application processes versus a system idle process. Hence, the load may simply be an indication of whether CPU 12 is in an active mode or a sleep mode for a given sampling cycle. In an active mode, the sampled CPU cycle is serving a user application. In a sleep mode, the sample CPU cycle is idle.

The sample interrupts may be performed periodically, e.g., every five milliseconds. Sampling module 40 adds the information collected via the interrupt samples to CPU profile data structure 42. Thus, CPU profile data structure 42 includes information collected from a number of sample interrupts over a period of time.

CPU profile data structure 42 represents an estimation of the load on CPU 12. In one embodiment, CPU profile data structure 42 maintains information collected during the most recent sample interrupts. For example, CPU profile data structure 42 may include information from the last n sample interrupts. Thus, when information from a new sample interrupt is collected, it overwrites the information from the oldest sample in CPU profile data structure 42.

Clock adjustment module 30 includes an adjustment algorithm 44 that is dynamically responsive to the contents of CPU profile data structure 42. Clock adjustment module 30 retrieves data from CPU profile data structure 42, and determines whether to make adjustments to the frequency of clock generator 16 based on the load profile represented by the CPU profile data structure.

When adjustment algorithm 44 determines that the clock frequency needs to be adjusted, adjustment algorithm 44 outputs an adjustment signal (labeled "ADJ" in FIG. 2) to clock generator 16, which adjusts its frequency accordingly. However, adjustment algorithm 44 accounts for the current frequency of clock generator 16. If adjustment algorithm 44 determines the load of CPU 12 is high, for example, and the frequency of clock generator 16 is already high, then adjustment algorithm 44 may not send an adjustment signal to clock generator 16.

In one embodiment, sampling module 40 performs a sample interrupt to determine whether CPU 12 is in a "sleep" mode during a given sampling cycle. In other words, sampling module 40 performs the interrupt to determine whether any of applications 34 are running on CPU 12. If none of applications 34 are running on CPU 12 during the sampling cycle, sampling module 40 determines that CPU 12 is in the sleep mode for the respective sampling cycle.

Sampling module 40 stores the determination of whether CPU 12 is in sleep mode or active mode in CPU profile data structure 42. CPU profile data structure 42 may, for example, include a number of 1's and 0's or Yes's and No's that indicate whether CPU 12 was in active mode or sleep mode at the time of the interrupt. For instance, a 1 or a Yes may represent that CPU 12 is in the sleep mode during that particular sample interrupt. In this manner, it is possible to determine a relative proportion of active mode cycles to sleep mode cycles over a sampling period to provide a metric of processing load.

Clock adjustment module 30 applies adjustment algorithm 44 to determine whether the frequency of clock generator 16 should be adjusted based on the number of samples that indicate that CPU 12 is in an active state, i.e., not in the "sleep" mode. Adjustment algorithm 44 may determine that the frequency of clock generator 16 must be increased when the number of samples indicating that CPU 12 is in the active state exceeds a threshold.

For example, adjustment algorithm may send an adjustment signal when the number of samples indicating that CPU 12 is in the active state reaches 80% of the total samples. Hence, adjustment algorithm 44 may include a simple comparator function that compares the number or active state samples to the threshold. If CPU profile data structure 42 maintains twenty samples, for instance, adjustment algorithm 44 determines the frequency of clock generator 16 needs to be increased when sixteen or more of the twenty samples indicate that CPU 12 is in the active state.

Similarly, adjustment algorithm 44 may determine the frequency of clock generator 16 needs to be decreased when the number of samples indicating that CPU 12 is in the active state falls below a minimum threshold. In one example, adjustment algorithm 44 may determine the frequency of clock generator 16 needs to be decreased when less than sixteen of the twenty samples indicate that CPU 12 is in the active state.

In order to avoid repeated transitions between increasing and decreasing the frequency of clock generator 16 at the boundary condition, however, adjustment algorithm 44 may include a hysteresis condition. In particular, adjustment algorithm 44 may wait until the number of samples indicating that CPU 12 is in the active state falls below 20% before decreasing the clock frequency. In this manner, the clock frequency will not transition up and down if the number of samples indicating that CPU 12 is in the active state, i.e., the number of 0's or No's, transitions between 15 and 16.

In another embodiment, sampling module 40 may perform sample interrupts that identify which of applications 34 are using CPU 12. Each application 34 has a corresponding process in the operating system, which is identified by a process ID. Hence, the respective application or applications can be identified by looking at the respective process ID of the running process as the interrupt occurs. With this information, sampling module 40 identifies the active applications running on CPU 12.

For example, sampling module 40 may identify from one of the sample interrupts that a voice application and a data application are both running on CPU 12. Thus, instead of simply identifying whether the CPU 12 is in sleep mode or in the active state, sampling module 40 may identify particular applications 34 using CPU 12. Sampling module 40 stores this information in CPU profile data structure 42. In this manner, CPU profile data structure 42 may include information identifying the applications running on CPU 12 at the time of the sample interrupt.

In this alternative embodiment, clock adjustment module 30 applies adjustment algorithm 44 to determine whether to adjust the frequency of clock generator 16 based on which applications 34 are using CPU 12. In particular, monitoring module 28 or clock adjustment module 30 may classify each of applications 34 running on CPU 12 and weight the running applications according to a frequency priority scheme. The applications may be identified and weighted by monitoring module 28 or clock adjustment module 30. The weighting may be reflected, for example, by values assigned to individual samples stored in CPU profile data structure 42.

For example, adjustment algorithm 44 may assign a high priority weight to an application that typically requires a high clock frequency, such as a camera application, and determine that the frequency needs to be increased to accommodate using such an application. In this case, adjustment algorithm 44 may be configured to avoid decreasing the frequency of clock generator 16 until there are no applications 34 running on CPU 12 with a high priority.

Figure 3:
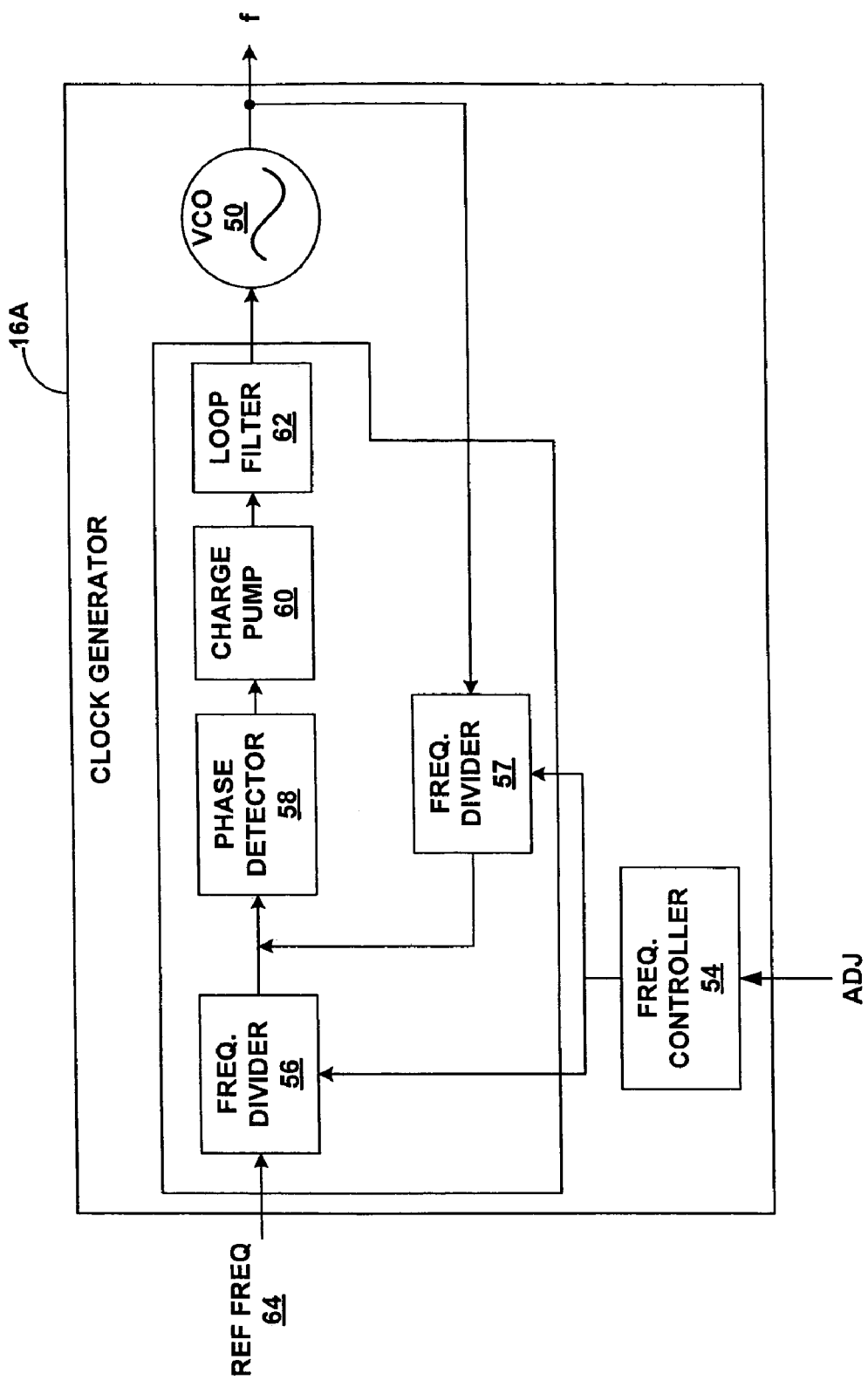
FIG. 3 is a block diagram of a clock generator in further detail.

FIG. 3 is a block diagram of a clock generator 16A in further detail. Clock generator 16A may correspond, for example, to clock generator 16 of FIG. 1. As shown in FIG. 3, clock generator 16A receives an adjustment signal from clock adjustment module 30 and increases or decreases an output frequency accordingly.

Clock generator 16A may comprise an oscillator such as a voltage controlled oscillator (VCO) 50 with a phase locked loop (PLL) 52 and a frequency controller 54. For example, PLL 52 may provide analog closed-loop control of the VCO 54 via an input control voltage. PLL 52 may include a number of components, including frequency dividers 56 and 57, a phase detector 58, a charge pump 60 and a loop filter 62. For example, frequency dividers 56 and 57 can respectively scale a reference frequency 64, e.g., a frequency provided by a crystal oscillator or an external clock source, and the VCO frequency, so that phase detector 58 can determine the frequency difference between the two frequencies. Charge pump 60 can then adjust the input voltage to VCO 50 as needed, to either increase or decrease the oscillator frequency. Loop filter 62 may perform filtering of the input signals to VCO 50 in order to improve performance of clock generator 16A and possibly reduce noise in the system.

Frequency divider 56 scales the oscillator frequency, such as by dividing the frequency by an integer. Similarly, second frequency divider 56 scales reference frequency 64, such as by dividing reference frequency 64 by an integer. Reference frequency 64, may be provided, for example, by a higher accuracy, lower frequency clock than VCO 50, such as a temperature compensated crystal oscillator (TCXO). The outputs of frequency dividers 56 and 57, respectively, form a signal indicative of the oscillator frequency (in this case, the frequency of VCO 50), and a signal indicative of the reference frequency 64. The output signals of frequency dividers 56 and 57 are scaled so that a measure of the phase difference between the signals can provide a measure of the error in VCO 50 and, thus adjust the output frequency of clock generator 16A.

Frequency controller 54 receives adjust signals from clock adjustment module 30 and adjusts the frequency output by clock generator 16A accordingly. Frequency controller 54 may, for example, reconfigure one or both of frequency dividers 56, 57 such that the scaling performed by frequency dividers 56, 57 results in an increase or decrease in frequency as desired. For example, frequency controller 54 may increase the integer value by which frequency divider 57 divides the output frequency and thus increase the output frequency of clock generator 16A.

Frequency controller 54 may incrementally adjust the frequency of clock generator 16A. In one embodiment, frequency controller 54 receives an adjustment signal from clock adjustment module 30 indicating that the frequency of clock generator 16A needs to be increased. Frequency controller 54 may incrementally adjust frequency dividers 56, 57 until frequency controller 54 receives an adjustment signal from clock adjustment module 30 indicating the need to decrease the frequency of clock generator 16A.

In some embodiments, however, frequency controller 54 may be configured to not allow the clock frequency to exceed a maximum value, e.g., 2.4 GHz. For example, frequency controller 54 may incrementally increase the frequency by doubling an integer value of frequency divider 57 until another adjustment signal is received or a maximum frequency is reached. Likewise, the frequency may be incrementally decreased when the adjustment signal from clock adjustment module 30 indicates the need to decrease the clock frequency. In some embodiments, however, the clock frequency may be increased or decreased immediately to a particular clock frequency.

In another example, clock adjustment module 30 may send an adjustment signal more than once during an "increase" or "decrease" episode of clock generator 16A. For example, clock adjustment module 30 may send a series of adjustment signals indicating the need to adjust the frequency of clock generator 16A. Frequency controller 54 may, in this example, increase the value of frequency divider 57 each time an adjustment signal is received until an adjustment signal indicating a need to decrease the frequency is received or the maximum frequency is reached.

Frequency dividers 56 and 57 may be implemented using a wide variety of different hardware configurations, including multiplier circuits, divider circuits, shift registers, counters, and the like. In one relatively simple configuration, frequency dividers 56 and 57 include counters that count the leading or trailing edges of oscillator pulses, and provide a signal each time an integer number of pulses is detected.

Other embodiments implementing various different oscillators within a clock, such as current controlled oscillators, and the like, may also implement similar techniques to those specifically described herein.

Figure 4:
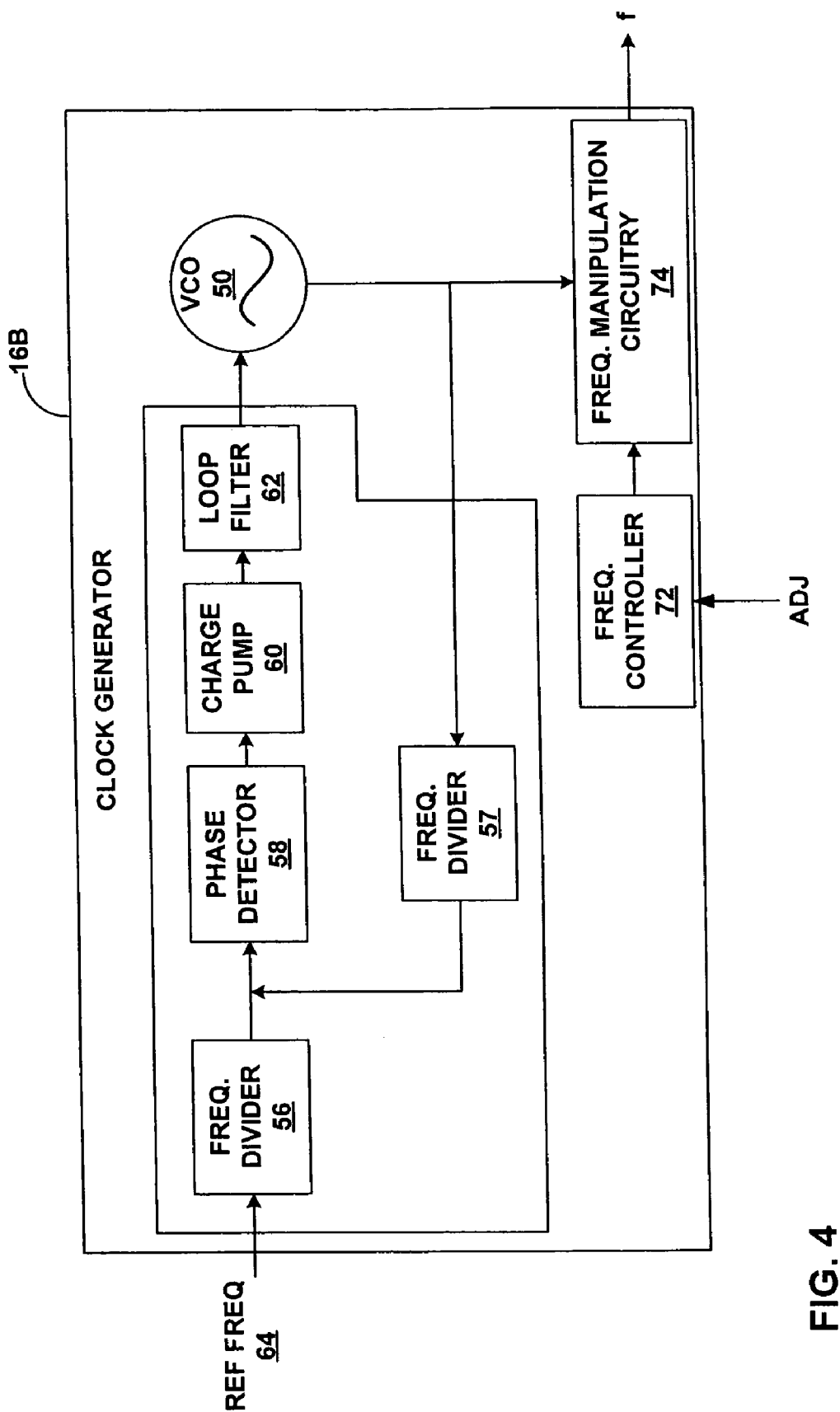
FIG. 4 is a block diagram illustrating another exemplary clock generator.

FIG. 4 is a block diagram illustrating another exemplary clock generator 16B. Clock generator 16B receives an adjustment signal from clock adjustment module 30 and increases or decreases an output frequency accordingly. Clock generator 16B may conform substantially to clock generator 16A of FIG. 3. In the example of FIG. 4, however, clock generator 16B includes a frequency controller 72 that controls frequency manipulation circuitry 74 instead of frequency dividers 56, 57. In this manner, frequency controller 72 directly adjusts the frequency of the output of VCO 50 instead of adjusting parameters to manipulate the input to the VCO.

In particular, frequency controller 72 adjusts frequency manipulation circuitry 74 in order to generate different frequencies from the signal provided by VCO 50. Frequency manipulation circuitry 74 may include one or more dividers and one or more multipliers. Frequency controller 72 may select, for example, which of the dividers and multipliers are applied to the signal from VCO 54. In this manner, frequency controller 72 may control the frequency output by clock generator 16B using frequency manipulation circuitry 74. For instance, frequency controller 72 may receive an adjustment signal indicating the need to increase the frequency of clock generator 16B and select a multiplier to apply to the signal from VCO 50 to increase the output frequency of clock generator 16B. Frequency controller 72 may further adjust the frequency of clock generator 16B in increments as described above with reference to FIG. 3.

Figure 5:
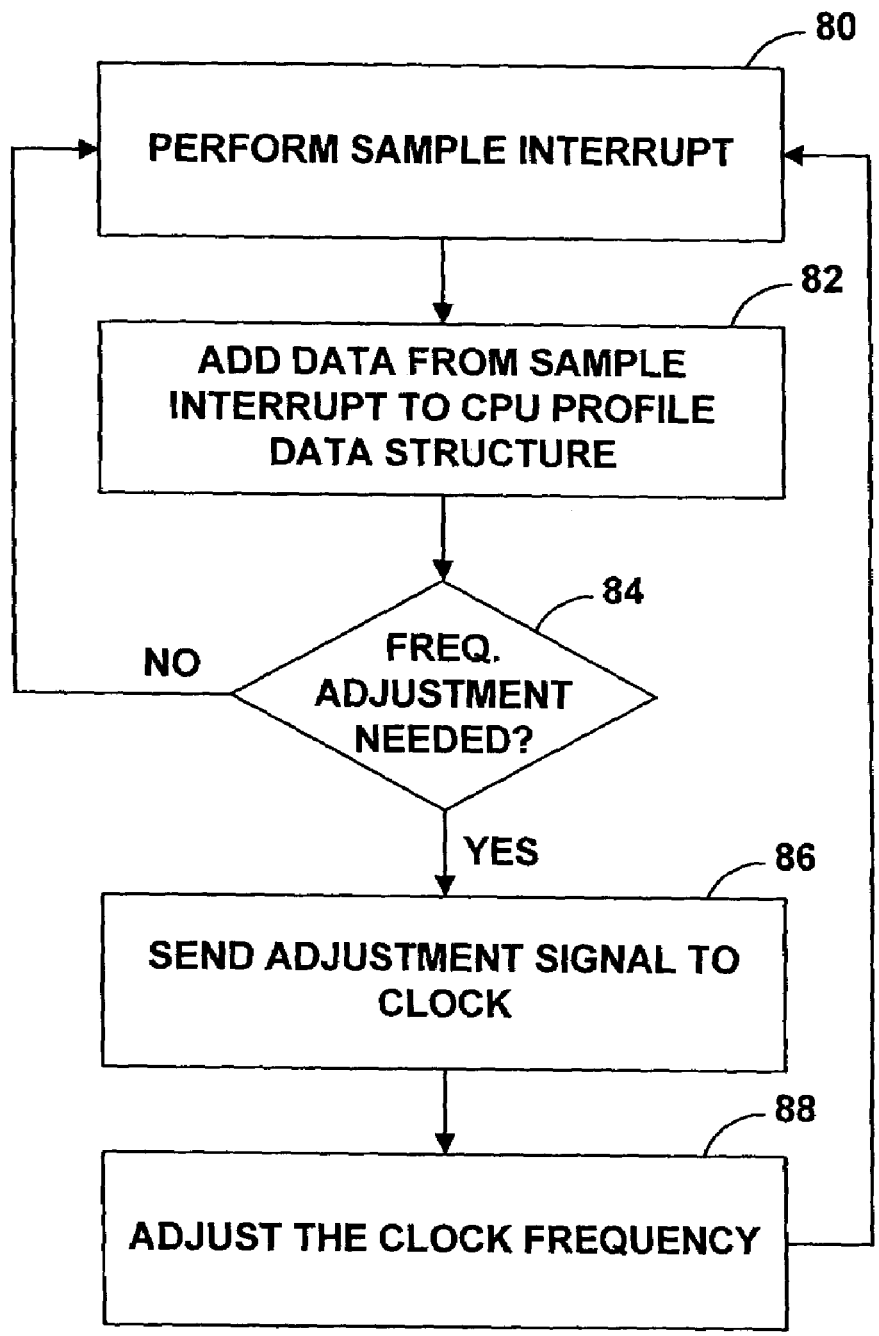
FIG. 5 is a flow diagram illustrating operation of a wireless computing device to adjust clock frequency as a function of the processing load on a CPU.

FIG. 5 is a flow diagram illustrating exemplary operation of a wireless computing device, such as wireless computing device 10 of FIG. 1, in adjusting the output frequency of a clock generator as a function of the load on a CPU 12. A CPU monitoring module 28 of wireless computing device 10 performs a sample interrupt to determine the load of CPU 12 at that particular time (80), i.e., at the particular CPU cycle. CPU monitoring module 28 may, for example, perform an interrupt to determine whether CPU 12 is in a "sleep" mode or an active mode. As another example, CPU load monitoring module 28 may perform an interrupt that identifies which of applications 34 are using CPU 12, in order to weight different applications according to a priority scheme.

CPU load monitoring module 28 stores the information collected via the sample interrupt in a CPU profile data structure, such as CPU profile data structure 42 of FIG. 2 (82). In one embodiment, CPU profile data structure 42 maintains information collected in the most recent sample interrupts. In particular, CPU profile data structure 42 indicates the which CPU cycles in a sampling interval were active and which CPU cycles were idle, thereby providing an indication of the proportion of active cycles versus sleep cycles.

Clock adjustment module 30 uses the information stored in the CPU profile data structure to determine whether or not to adjust the frequency of clock generator 16 (84). Clock adjustment module 30 may analyze the information in the CPU profile data structure to determine whether the load on CPU 12 is "high" or "low." For example, clock adjustment module 30 may determine that the clock frequency need to be increased if the load of CPU 12 is high and the current frequency of clock generator 16 is low. In one embodiment, clock adjustment module 30 determine the load on CPU 12 is high when the number of samples indicating that CPU 12 is in the active state exceeds a threshold, as described in detail above.

Clock adjustment module 30 sends an adjustment signal to clock generator 16 if an adjustment of the frequency of clock generator 16 is needed (86). Again, the adjustment may be an upward or downward adjustment. Clock generator 16 may include a frequency controller that adjusts the output frequency of clock generator 16 (88). The frequency controller may adjust the output frequency of clock generator 16, for example, by adjusting one or more frequency dividers or multipliers. As described above, the frequency controller may adjust the output frequency of clock generator 16 incrementally.

Figure 6:
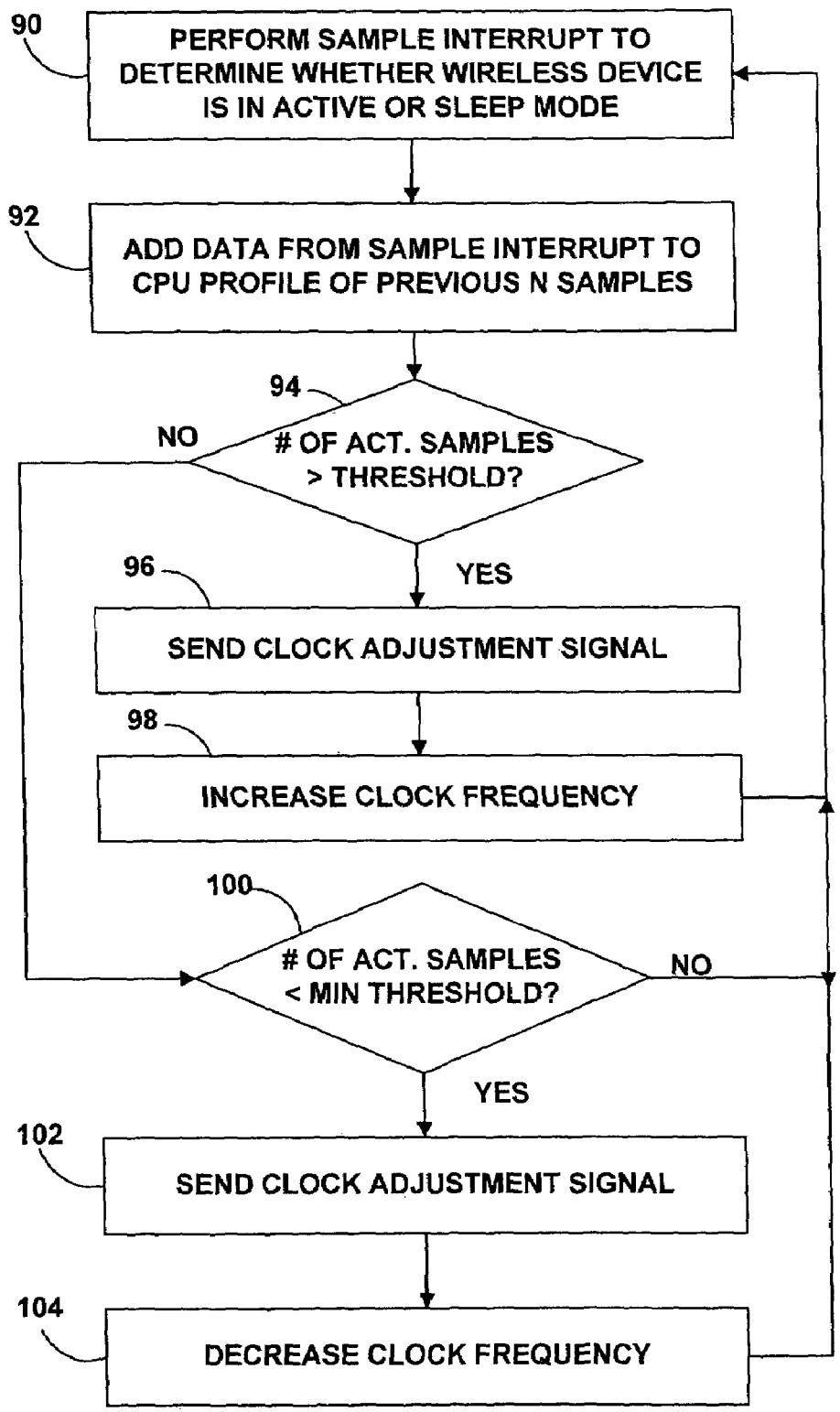
FIG. 6 is a flow diagram illustrating operation of a wireless device to adjust clock frequency using sample interrupts that determine whether a CPU is in sleep mode.

FIG. 6 is a flow diagram illustrating exemplary operation of a wireless device adjusting the output frequency of its associated clock using sample interrupts that determine whether the CPU is in sleep mode. Initially, a CPU monitoring module 28 performs a sample interrupt to determine whether CPU 12 is in a "sleep" mode (90). CPU monitoring module 28 may, for example, perform the interrupt to determine whether any of applications 34 are running on CPU 12. If none of applications 34 are running on CPU 12, CPU monitoring module 28 determines that CPU 12 is in the sleep mode.

CPU monitoring module 28 stores the determination of whether CPU 12 is in sleep mode in a CPU profile data structure (92). CPU monitoring module 28 may, for example, store a '1' or a 'Yes' in the CPU profile data structure if CPU 12 is in a sleep mode at the time of the interrupt and a '0' or 'No' if CPU 12 is not in sleep mode, i.e., is actively running at least one of applications 34, at the time of the interrupt. As described above, the CPU profile data structure may include information collected from the most recent interrupts, e.g., the last twenty interrupts.

Clock adjustment module 30 determines whether the number of samples that indicate that CPU 12 is in the active state exceeds a threshold (94). When the number of samples that indicate that CPU 12 is in the active state exceeds a threshold, clock adjustment module 30 sends an adjustment signal to clock generator 16 indicating the need to increase the frequency of clock generator 16 (96). For example, clock adjustment module 30 may send an adjustment signal when the number of samples indicating that CPU 12 is in the active state reaches 80% of the total samples.

If the CPU profile data structure maintains twenty samples, for instance, clock adjustment module 30 determines the frequency of clock generator 16 needs to be increased when sixteen or more of the twenty samples indicate that CPU 12 is in the active state. The exact number of samples and relative thresholds described herein are purely for purposes of illustration, and should not be considered limiting. Clock generator 16 adjusts the frequency accordingly in response to the adjustment signal (98). Although not illustrated in FIG. 6, the upward clock adjustment may be qualified by the condition that, in some situations, the clock frequency may already be operating at a maximum level.

When the number of samples that indicate that CPU 12 is in the active state falls below a threshold, clock adjustment module 30 sends an adjustment signal to clock generator 16 indicating the need to decrease the frequency of clock generator 16 (100, 102). Clock adjustment module 30 may, for example, wait until the number of samples indicating that CPU 12 is in sleep mode falls below 20% before decreasing the clock frequency, providing a hysteresis function.

In this manner, the clock adjustment module will not send adjustment signals that cause clock generator 16 to repeatedly transition upward and downward if the number of samples indicating that CPU 12 is in the active state, i.e., the number of 1's or Yes's, toggle between fifteen and sixteen of the twenty total samples. Clock generator 16 adjusts the frequency accordingly in response to the adjustment signal (104). Although not illustrated in FIG. 6, the downward clock adjustment may be qualified by the condition that, in some situations, the clock frequency may already be operating at a minimum level.

Example hardware implementations for the functional components described herein may include implementations within a microprocessor, digital signal processor (DSP), an application specific integrated circuit (ASIC), a field programmable gate array (FPGA), a programmable logic device, specifically designed hardware components, or any combination thereof. In addition, one or more of the techniques described herein may be partially or wholly executed in software. In that case, a computer readable medium may store or otherwise comprise computer-readable instructions, i.e., program code that can be executed by a processor or DSP of a computing device to carry out one of more of the techniques described above. For example, the computer readable medium may comprise random access memory (RAM), read-only memory (ROM), non-volatile random access memory (NVRAM), electrically erasable programmable read-only memory (EEPROM), flash memory, or the like.

Various embodiments have been described. The techniques described herein are not limited to wireless communication devices. The techniques may be applied to any wired or wireless device in which power conservation techniques would be advantageous. These and other embodiments are within the scope of the following claims.

The invention claimed is:

1. A device comprising:
    a monitoring module that performs sample interrupts to determine a status of a processor at particular times;
    a clock adjustment module that determines a load of the processor based on the status determined by the monitoring module, and generates a clock adjustment based on the determined load and a current processor clock frequency, wherein the load of the processor comprises a relative proportion of active mode cycles to sleep mode cycles over a sampling period, wherein the clock adjustment module generates a first clock adjustment when the load of the processor exceeds a first threshold value and a second clock adjustment when the load of the processor falls below a second threshold value, wherein the first threshold value is higher than the second threshold value to provide a hysteresis function; and
    a frequency controller being responsive to the clock adjustments to adjust the current processor clock frequency, wherein the frequency controller adjusts the current processor clock frequency as a function of the first or second clock adjustment.

2. The device of claim 1, wherein the monitoring module performs sample interrupts to determine whether the processor is in an active state or a sleep state.

3. A device comprising:
    a monitoring module that performs sample interrupts to determine a status of a processor at particular times, wherein the monitoring module determines whether the processor is in an active state or a sleep state based on the sample interrupts;
    a clock adjustment module that determines a load of the processor based on the status determined by the monitoring module, and generates a clock adjustment based on the determined load, wherein the load of the processor comprises a relative proportion of active mode cycles to sleep mode cycles over a sampling period, wherein the clock adjustment module generates a first clock adjustment when the load of the processor exceeds a first threshold value and a second clock adjustment when the load of the processor falls below a second threshold value, wherein the first threshold value is higher than the second threshold value to provide a hysteresis function, wherein the clock adjustment module generates the clock adjustment to increase the clock frequency when a number of the sample interrupts indicating that the processor is in an active state exceeds the first threshold value; and a frequency controller being responsive to the clock adjustments to adjust the current processor clock frequency, wherein the frequency controller adjusts the current processor clock frequency as a function of the first or second clock adjustment.

4. A device comprising:

a monitoring module that performs sample interrupts to determine a status of a processor at particular times, wherein the monitoring module determines the processor in an active state or a sleep state based on the sample interrupts;

a clock adjustment module that determines a load of the processor based on the status determined by the monitoring module, and generates a clock adjustment based on the determined load, wherein the load of the processor comprises a relative proportion of active mode cycles to sleep mode cycles over a sampling period, wherein the clock adjustment module generates a first clock adjustment when the load of the processor exceeds a first threshold value and a second clock adjustment when the load of the processor falls below a second threshold value, wherein the first threshold value is higher than the second threshold value to provide a hysteresis function, wherein the clock adjustment module generates the clock adjustment to reduce the clock frequency when a number of the sample interrupts indicating that the processor is in an active state is below the second threshold value; and a frequency controller being responsive to the clock adjustments to adjust the current processor clock frequency, wherein the ,frequency controller adjusts the current processor clock frequency as a function of the first or second clock adjustment.

5. The device of claim 1, wherein the monitoring module performs sample interrupts to identify one or more applications currently running on the processor.

6. A device comprising:

a monitoring module that performs sample interrupts to determine a status of a processor at particular times;

a clock adjustment module that determines a load of the processor based on the status. determined by the monitoring module, and generates clock adjustment based on the determined load; and a frequency controller that adjusts a processor clock frequency as a function of the clock adjustment;

wherein the monitoring module performs sample interrupts to identify one or more applications currently running on the processor; and wherein the monitoring module, assigns a priority value to each of the applications running on the processor, and the clock adjustment module generates the clock adjustment to adjust the clock frequency based on the priorities assigned to the applications.

7. The device of claim 1, wherein the monitoring module stores information collected during the sample interrupts in a load profile data structure.

8. The device of claim 7, wherein the clock adjustment module retrieves data from the load profile data structure to determine the load, and wherein the load profile data structure includes, for each of the last n sample interrupts, an indication whether the processor was in active mode or in sleep mode at the time of the interrupt.

9. The device of claim 1, wherein the clock adjustment module generates the clock adjustment to incrementally adjust the clock frequency by doubling an integer value of a frequency divider until another adjustment signal is received or a maximum frequency is reached.

10. The device of claim 1, wherein the frequency controller reconfigures the frequency divider of a phase-locked loop in order to scale one of a reference frequency and an oscillator frequency to adjust the clock frequency.

11. The device of claim 1, wherein the frequency controller selectively applies one of a multiplier and a divider to an output of an oscillator to adjust the clock frequency.

12. The device of claim 1, further comprising a phase-locked loop that includes a first frequency divider to scale a reference frequency and a second frequency divider to scale a frequency output by an oscillator, wherein the frequency controller reconfigures at least one of the first and second frequency dividers of the phase-locked loop to adjust the clock frequency.

13. The device of claim 1, further comprising frequency manipulation circuitry that includes at least one of a frequency divider and a frequency multiplier, and wherein the frequency controller, selectively applies the one of the frequency divider and the frequency multiplier to an output of an oscillator to adjust the clock frequency.

14. The device of claim 1, wherein the device is a wireless communication device.

15. A method comprising:

performing sample interrupts to determine a status of a processor at particular times;

determining a load of the processor based on the sample interrupts, wherein a clock adjustment is generated based on the determined load and a current clock frequency to the processor, wherein the load of the processor comprises a relative proportion of active mode cycles to sleep mode cycles over a sampling period;

generating a first clock adjustment when the load of the processor exceeds a first threshold value;

generating a second clock adjustment when the load of the processor falls below a second threshold value; and adjusting the clock frequency to the processor as a function of the first or second clock adjustment.

16. A method comprising:

performing sample interrupts to determine a status of a processor at particular times;

determining whether the processor is in an active state or a sleep state based on the sample interrupts;

determining a load of the processor based on the sample interrupts, wherein the load of the processor comprises a relative proportion of active mode cycles to sleep mode cycles over a sampling period;

generating a first clock adjustment when the load of the processor exceeds a first threshold value;

generating a second clock adjustment when the load of the processor falls below a second threshold value;

adjusting a clock frequency to the processor as a function of the first or second clock adjustment; and increasing the clock frequency when a number of the sample interrupts indicating that the processor is in an active state exceeds the first threshold value.

17. A method comprising:

performing sample interrupts to determine a status of a processor at particular times;

determining whether the processor is in an active state or a sleep state based on the sample interrupts;

determining a load of the processor based on the sample interrupts, wherein the load of the processor comprises a relative proportion of active mode cycles to sleep mode cycles over a sampling period;

generating a first clock adjustment when the load of the processor exceeds a first threshold value;

generating a second clock adjustment when the load of the processor falls below a second threshold value;

adjusting a clock frequency to the processor as a function of the first or second clock adjustment; and reducing the clock frequency when a number of the sample interrupts indicating that the processor is in an active state is below the second threshold value.

18. The method of claim 15, wherein performing sample interrupts comprises performing sample interrupts to identify one or more applications currently running on the processor.

19. A method comprising:

performing sample interrupts to determine a status of a processor at particular times;

determining a load of the processor based on the sample interrupts;

adjusting a clock frequency to the processor as a function of the load of the processor;

assigning a priority value to each of the applications running on the processor; and adjusting the clock frequency based on the priorities assigned to the applications.

20. The method of claim 15, further comprising storing information collected during the sample interrupts in a load profile data structure.

21. The method of claim 20, wherein determining load of the processor includes retrieving data from the load profile data structure to determine the load.

22. The method of claim 15, wherein adjusting the clock frequency as a function of the load of the processor comprises incrementally adjusting the clock frequency.

23. The method of claim 15, wherein adjusting the clock frequency comprises reconfiguring a frequency divider of a phase-locked loop in order to scale one of a reference frequency and an oscillator frequency to adjust the clock frequency.

24. The method of claim 15, wherein adjusting the clock frequency comprises selectively applying one of a multiplier and a divider to an output of an oscillator to adjust the clock frequency.

25. A computer-readable medium comprising instructions to cause a processor to:

perform sample interrupts to determine a status of a processor at particular times;

determine a load of the processor based on the sample interrupts, wherein a clock adjustment is generated based on the determined load and a current clock frequency to the processor, wherein the load of the processor comprises a relative proportion of active mode cycles to sleep mode cycles over a sampling period;

generate a first clock adjustment when the load of the processor exceeds a first threshold value;

generate a second clock adjustment when the load of the processor falls below a second threshold value; and generate an adjustment to the clock frequency to the processor as a function of the first or second clock adjustment.

26. The computer-readable medium of claim 25, wherein the instructions cause the processor to determine whether the processor is in an active state or a sleep state based on the sample interrupts.

27. The computer-readable medium of claim 26, wherein the instructions cause the processor to determine the load of the processor to be high when a number of the sample interrupts that indicate that the processor is in the active state exceeds the first threshold value.

28. A computer-readable medium comprising instructions to cause a processor to:

perform sample interrupts to determine a status of a processor at particular times, wherein the instructions cause the processor to determine whether the processor is in an active state or a sleep state based on the sample interrupts, and generate a clock adjustment to reduce a clock frequency when a number of the sample interrupts indicating that the processor is in an active state is below a second threshold value;

determine a load of the processor based on the sample interrupts, wherein the load of the processor comprises a relative proportion of active mode cycles to sleep mode cycles over a sampling period;

generate a first clock adjustment when the load of the processor exceeds a first threshold value;

generate a second clock adjustment when the load of the processor falls below a second threshold value; and generate an adjustment to the clock frequency to the processor as a function of the first or second clock adjustment.

29. An apparatus comprising:

means for performing sample interrupts to determine a status of a processor at particular times;

means for determining a load of the processor based on the sample interrupts, wherein a clock adjustment is generated based on the determined load and a current clock frequency to the processor, wherein the load of the processor comprises a relative proportion of active mode cycles to sleep mode cycles over a sampling period;

means for generating a first clock adjustment when the load of the processor exceeds a first threshold value;

means for generating a second clock adjustment when the load of the processor falls below a second threshold value; and means for adjusting the clock frequency to the processor as a, function of the first or second clock adjustment.

30. The device of claim 5, wherein the monitoring module weights the applications according to a frequency priority scheme.

31. The device of claim 1, wherein the monitoring module receives, in response to each sample interrupt, status information for the processor at the time of the sample interrupt, and wherein the load of the processor is determined from the status information that is collected from multiple sample interrupts.

* * * * *